April 24, 1945. KAJ LEO JENSEN 2,374,434
CENTRIFUGAL GOVERNOR
Filed Jan. 26, 1942 2 Sheets-Sheet 1

Inventor
Kaj Leo Jensen
By
Atty

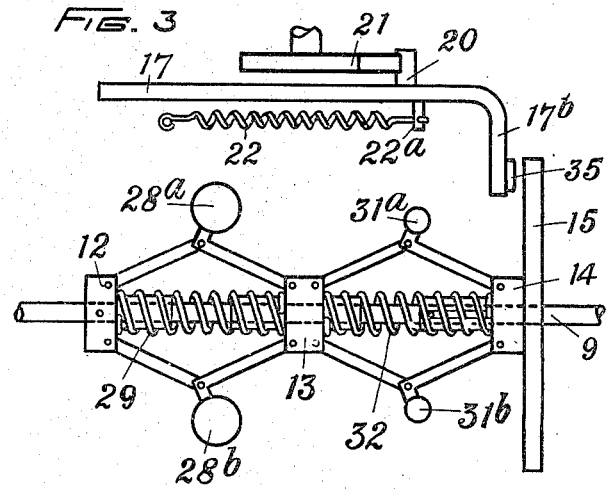
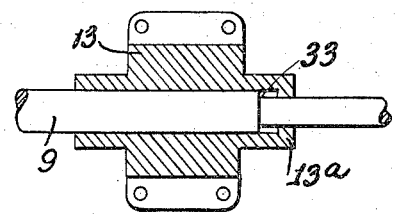
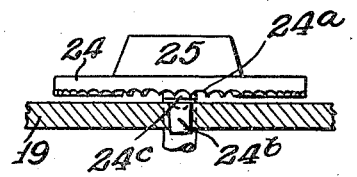
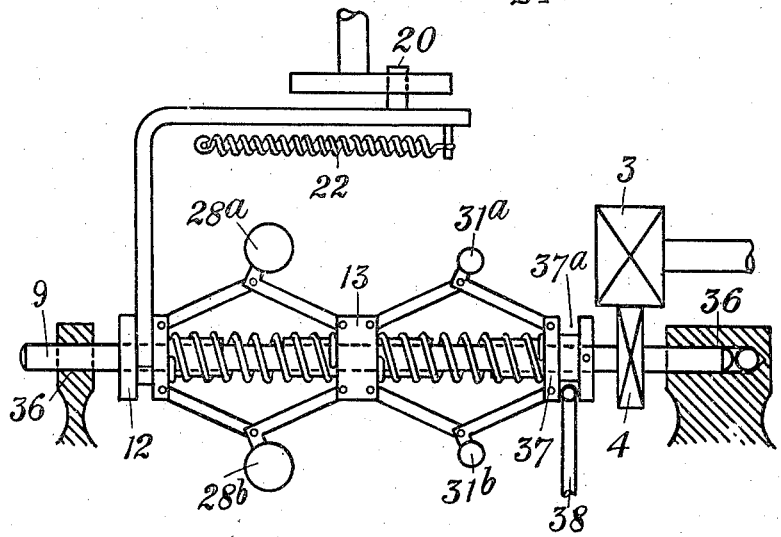

Patented Apr. 24, 1945

2,374,434

UNITED STATES PATENT OFFICE 2,374,434

CENTRIFUGAL GOVERNOR

Kaj Leo Jensen, Edgware, England

Application January 26, 1942, Serial No. 428,307
In Great Britain February 12, 1941

4 Claims. (Cl. 192—104)

This invention has for its object to provide an improved speed regulator. It consists of three parts, viz., a control device, a centrifugal governor combination and a speed setting cam combined with a speed dial indicator or scale. The control device may be a slipping clutch, a friction brake, a control lever or the like. A special feature of this speed regulator is its high range which is obtained by using a combination of two or more centrifugal governors and the control device.

In the accompanying drawings:

Fig. 3 shows a modified construction of two-governor regulator employing a friction brake instead of a slipping clutch;

Figure 4 is an enlarged broken sectional view, partly in elevation, showing the relation of the collar and spindle for cooperation.

Figure 5 is a detailed view in elevation, partly in section, showing the speed setting knob formed for selective step operation.

Fig. 6 shows the governor combination used in connection with a type of engine where the speed is adjusted by regulating the fuel admission.

Figure 1:
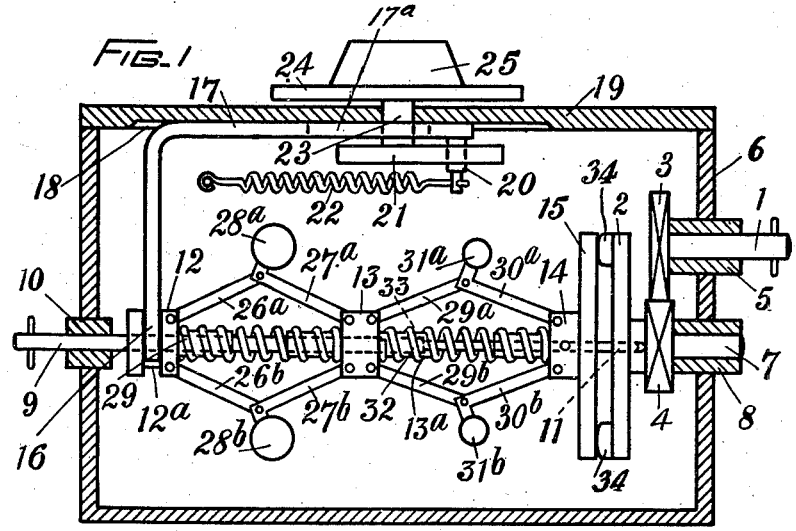
Fig. 1 is a side elevation, partly in section, of a speed regulator comprising a centrifugal governor-slipping clutch combination in accordance with the present invention, the regulator having two centrifugal governors.

In Fig. 1 the main spindle 1 drives a friction disc 2 through suitable gear wheels 3 and 4, the said spindle being borne by sleeve 5 in the casing 6 and the spindle 7 of the wheel 4 and the disc 2 by sleeve 8 in the said casing. The ratio of the gear 3—4 is chosen so that the final speed of the friction disc 2 is in excess of the maximum speed required on the regulator spindle 9.

The spindle 9 is supported by a fixed bearing 10 at its left hand end, and the right hand end is supported in a central hole 11 in the disc 2.

Figure 2:
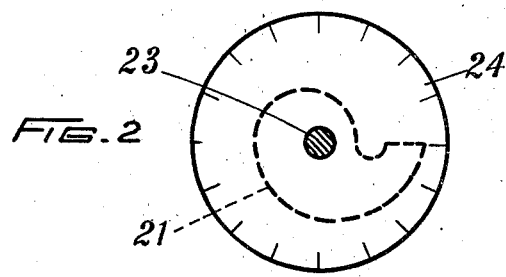
Fig. 2 is a plan view of a scale and speed setting cam used in the regulator.

On the regulator spindle are mounted three collars 12, 13 and 14 of which 12 and 13 are loose on the spindle while 14 is fixed to the spindle and carries a friction disc 15. In collar 12 is a groove 12a into which fits the forked end 16 of a speed setting arm 17. The horizontal part of arm 17 fits in a slide 18 in the lid 19 of the casing. A stud 20 on arm 17 is pressed against the speed setting cam 21 (see also Fig. 2) by the action of spring 22, the spindle 23 of the cam being mounted on the lid 19 and having a scale 24 with knob 25 fixed to it. The lid has a fixed pointer, not shown, for co-operation with the scale. The arm 17 is slotted at 17a to permit of the passage of the spindle 23 through it.

Between collars 12 and 13 are mounted pivoted arms 26a, 26b, 27a and 27b, the latter carrying governor masses 28a and 28b. The collars are forced apart by spring 29. In a like manner collars 13 and 14 are interconnected by pivoted arms 29a, 29b, 30a and 30b carrying governor masses 31a and 31b, and these two collars are forced apart by spring 32. The arms 27a, 27b and 30a, 30b are of bell crank form.

Springs 29 and 32 and masses 28a, 28b and 31a, 31b are so dimensioned that the left hand section will close up due to the centrifugal force on the masses 28a, 28b, for relatively slow speeds, whereas a similar action takes place as regards the right hand section at relatively high speeds only.

The action of the apparatus is as follows:

With friction disc 2 revolving at low speed, spindle 9 is driven at the same speed through the friction coupling between discs 2 and 15. As the speed is raised, however, the centrifugal force on masses 28a, 28b becomes high enough to overcome the force of spring 29. Collar 13 consequently moves to the left bringing with it spindle 9 because the collar is resting against a step 33 on the spindle situated inside the extension 13a of the collar. As disc 15 is fixed to spindle 9 it participates in the motion to the left, thus moving away from the friction pads 34 on disc 2. Immediately this occurs, the speed of spindle 9 falls because it is no longer supplied with driving power from disc 2. This fall of speed is very small but has the effect of reducing the centrifugal force on masses 28a, 28b, and consequently collar 13 again moves to the right and through the medium of spring 32 disc 15 is again made to contact with friction pads 34, causing spindle 9 to be again driven. This sequence of operations repeats itself with the result that the speed of spindle 9 can never exceed a value governed by the pressure of spring 29 and by the magnitude of masses 28a, 28b.

By turning the knob 25 clockwise, speed setting cam 21 forces stud 20 and, therefore, collar 12 to the right. Spring 29 is thus compressed further and the speed at which the centrifugal force on governor masses 28a, 28b balances the compressive force of the spring will consequently be higher, i. e. only at an increased speed will slipping take place between friction discs 2 and 15, and spindle 9 will, therefore, now run at this higher speed.

In order to obtain still higher speeds, collar 12 is moved further to the right causing the left hand governor section to close up owing to the extensions of collars 12 and 13 touching each other. Only the right hand governor section will now be operating and this is dimensioned so as, from a point on the speed range just below that where the left hand governor section ceases to function, to be in readiness to take full charge when the left hand governor so ceases.

The cam profile is, of course, made to correspond to the scale markings.

It will be seen that by combining the two governor sections or masses as described a very high total speed range is obtained for the combination; if, for example, each governor section covers a speed range of 1:4, that is the highest operative speed is four times the lowest operative speed, which is very easily obtainable in practice, the speed range of the combination will be $1:4^2$, or 1:16.

As wear takes place on the friction pads the calibration of the scale no longer corresponds to the actual speeds obtained, but compensation for wear is easily obtained, for example, by so mounting the sleeve 8 for the spindle 7 as to enable it to be moved to the left to compensate for wear of the friction disc. This method allows the compensating means to be easily accessible from the outside of the casing.

In some applications the variation of the speed in specified steps is preferable to a continuously variable speed, one advantage being that it is then easier to return to a certain setting after an excursion to another speed setting has been made. This is achieved by notching the underside of dial disc 24, as at 24a, Figure 5, and providing a ball click 24b in the lid 19, the ball click being in known form. The ball 24c is yieldingly urged into a notch immediately above it, and as the disc 24 is turned by the knob 25, the ball, by contact with the flanks of the notches, acts as a flirt, insuring that the disc moves in determined steps. An added advantage of this construction is that any likelihood of the cam moving owing to the tension of spring 22 is entirely eliminated.

Instead of providing the spindle 9 with a step 33 engaged by a shoulder in extension 13a the spindle could be made the same diameter throughout and the shoulder in 13a omitted, in which case the action is as follows:

At rest the governor arms make angles with the horizontal which depend on the relative stiffness of governor springs 29 and 32 and on the dimensions of the governor sections. As soon as the governor masses start to move at a low speed, masses 28a, 28b move out due to the centrifugal force acting on them. The centrifugal force acting on governor masses 31a, 31b is much smaller and the effect is that collar 13 moves to the left and not until the angle between the high speed section governor arms and the horizontal has been reduced a certain amount is collar 14 and friction disc 15 pulled to the left, thus effecting slipping of the clutch portion. The effect is that to obtain a given low speed, collar 12 has to be set to a position further to the left than is the case when a stepped spindle is employed.

A spindle of uniform diameter is shown in Fig. 3. Additionally, in this modification the vertical arm 17b of the setting arm 17 is located adjacent to the friction disc 15 and is provided with a brake pad 35, the disc 2 is omitted and the disc 15 is slidable (but not rotatable) on the spindle 9. Therefore, the disc 15 and the pad 35 are comparable with like elements of a gramophone governor. As the spindle 9 starts to revolve the disc 15 moves to the left until it engages with the brake pad 35. The driving spindle 1 is thus braked with a consequent fall of speed which causes the disc 15 to move away from the pad 34. Immediately this happens the speed increases, the disc is again braked and so on. The further the brake pad is moved to the left, the higher will be the controlled speed. Movement of the pad is effected by rotating the cam 21, the stud 20 being on top of the horizontal part of the arm 17 and the spring 22 being attached at its right hand end to a pin 22a on the lever instead of to the stud.

In the modification shown in Fig. 6, the discs 2 and 15 are omitted, the ends of the spindle 9 being supported by bearings 36, the collar 14 (Fig. 1) is replaced by a collar 37 in which is a groove 37a containing one end of a control lever 38, and the pinion 3 is considerably longer than the wheel 3 of Fig. 1 because the spindle to which collar 37 is fixed may have to have a considerably greater range of movement than does the spindle 9 of Fig. 1. The stud 20 is arranged on and the spring 22 attached to the arm 17 as described with reference to Fig. 3. The collar 37, when the regulator is in operation, displaces the control lever which, for example, cuts off the fuel supply to an internal combustion engine. Otherwise the action is as described in connection with Fig. 1 in the case where the spindle is not stepped.

In some applications it may be desirable to employ more than two governor sections either because the speed range required is higher than conveniently obtainable by using only two governor sections, or because it may be desired to have a smoother curve of speed/displacement of the speed setting lever than is obtainable with two governor sections. A three-governor speed regulator is shown in Fig. 7.

Figure 7:
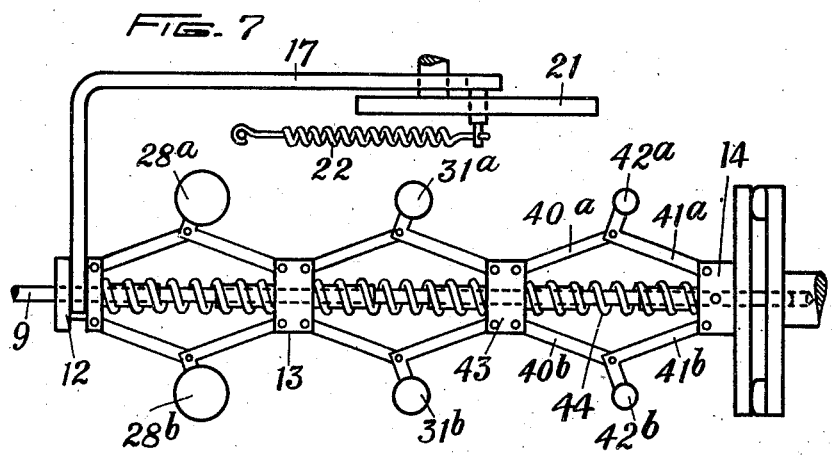
Fig. 7 is a side elevation of a three-governor combination.

The said regulator in Fig. 7 differs from that shown in Fig. 1 in that the spindle 9 is lengthened and is of uniform diameter throughout its length and a third governor comprising pivoted arms 40a and 40b, 41a, and 41b, the latter arms carrying masses 42a and 42b respectively, a collar 43 and a spring 44 is interposed between the governor comprising the masses 31a and 31b and the collar 14. Control movements of the masses 28a and 28b are transmitted to the collar 14 by the two remaining governors, control movements of the governor comprising the masses 31a is transmitted to the collar 14 by the third governor and the third governor acts on the collar 14 directly.

What I claim is:

1. A centrifugal governor, comprising a main spindle, a plurality of elemental governors, a speed setting means and a control device, said elemental governors being normally responsive to relatively-different rotational speed ranges and comprising a row of collars mounted in axial alignment on the main spindle, governor arms extending from collar to collar and governor masses carried by the arms, one of said collars being displaceable in axial direction by said speed setting means operative on one of the end collars and said control device comprising a frictionally engaging element connected to the other end collar, the speed setting means being operated to vary the normal elemental governor action of the control device.

2. A centrifugal governor, including a spindle reduced in diameter in steps and mounted for axial sliding and rotatable movement, a plurality of elemental governors mounted on said spindle, said governors being normally responsive to relatively different rotational speed ranges, a control device for governing the speed of said spindle, said governors being mounted in axial alignment on the spindle and including a row of collars, the governor arms extending from collar to collar and governor masses carried by said arms, the collar on one end of the spindle being fixed relative thereto and serving to provide effective control displacement of the control device and speed setting means for displacing the collar remote from the control device along the spindle, the intermediate collars being internally flanged for engagement with the step or steps on the spindle.

3. A centrifugal governor, including a spindle reduced in diameter in steps and mounted for axial sliding and rotatable movement, a plurality of elemental governors mounted on said spindle, said governors being normally responsive to relatively different rotational speed ranges, a control device for governing the speed of said spindle, said governors comprising a row of collars, governor means extending from collar to collar and governor masses carried by said arms, said collars being axially displaceable, one endmost collar operating when displaced to effect displacement of said control device, and speed setting means operating to displace the opposite endmost collar.

4. A centrifugal governor, including a spindle, a plurality of elemental governors mounted on said spindle, said governors being normally responsive to relatively different rotational speed ranges, a speed setting means, a control device for governing the speed of said spindle, said governors being mounted in axial alignment on said spindle and including a row of collars, governor arms extending from collar to collar and governor masses carried by said arms, the collars being displaceable in axial direction by the speed setting means, the collar at one end of the row operating to cause effective controlling displacement of the control device.

KAJ LEO JENSEN.